United States Patent [19]

Wallgard et al.

[11] 3,848,836

[45] Nov. 19, 1974

[54] CAR ACTUATED INDUCTIVE BLOCK CONTROL

[75] Inventors: Gunnar Alexius Wallgard, Huskvarna; Lars-Gunnar Rinnfors, Jonkoping, both of Sweden

[73] Assignee: Saab-Scania Aktiebolag, Linkoping, Sweden

[22] Filed: Dec. 26, 1973

[21] Appl. No.: 428,130

[30] Foreign Application Priority Data

Jan. 3, 1973 Sweden.............................. 7300053

[52] U.S. Cl................ 246/63 R, 246/28 R, 246/91
[51] Int. Cl............................................. B61l 13/00
[58] Field of Search.... 246/28 R, 34 R, 63 R, 63 A, 246/63 C, 91; 104/153

[56] References Cited
UNITED STATES PATENTS

| | | | |
|---|---|---|---|
| 3,251,989 | 5/1966 | Hughson | 246/63 A |
| 3,387,880 | 6/1968 | DeBiasi | 104/153 |
| 3,638,014 | 1/1972 | Wallgard | 246/91 |
| 3,748,466 | 6/1971 | Sibley et al. | 246/63 C |

*Primary Examiner*—M. Henson Wood, Jr.
*Assistant Examiner*—George H. Libman

[57] ABSTRACT

Driverless vehicles move in one direction along elongated, lengthwise adjacent radiators that are energized with command signals to which the vehicles respond. The radiators are grouped in lengthwise adjacent blocks. A radiator just in front of each block boundary and another just behind it are energizable alternatively through a bistable switch device. A vehicle crossing a block boundary generates a control signal which actuates the switch device for that boundary, transferring energization from the radiator just behind the boundary to the one just ahead of it, so the vehicle can advance into the block in front of the boundary. Boundary crossing also actuates the switch device for the boundary behind the vehicle, to enable a following vehicle to approach the block the first vehicle is leaving.

4 Claims, 2 Drawing Figures

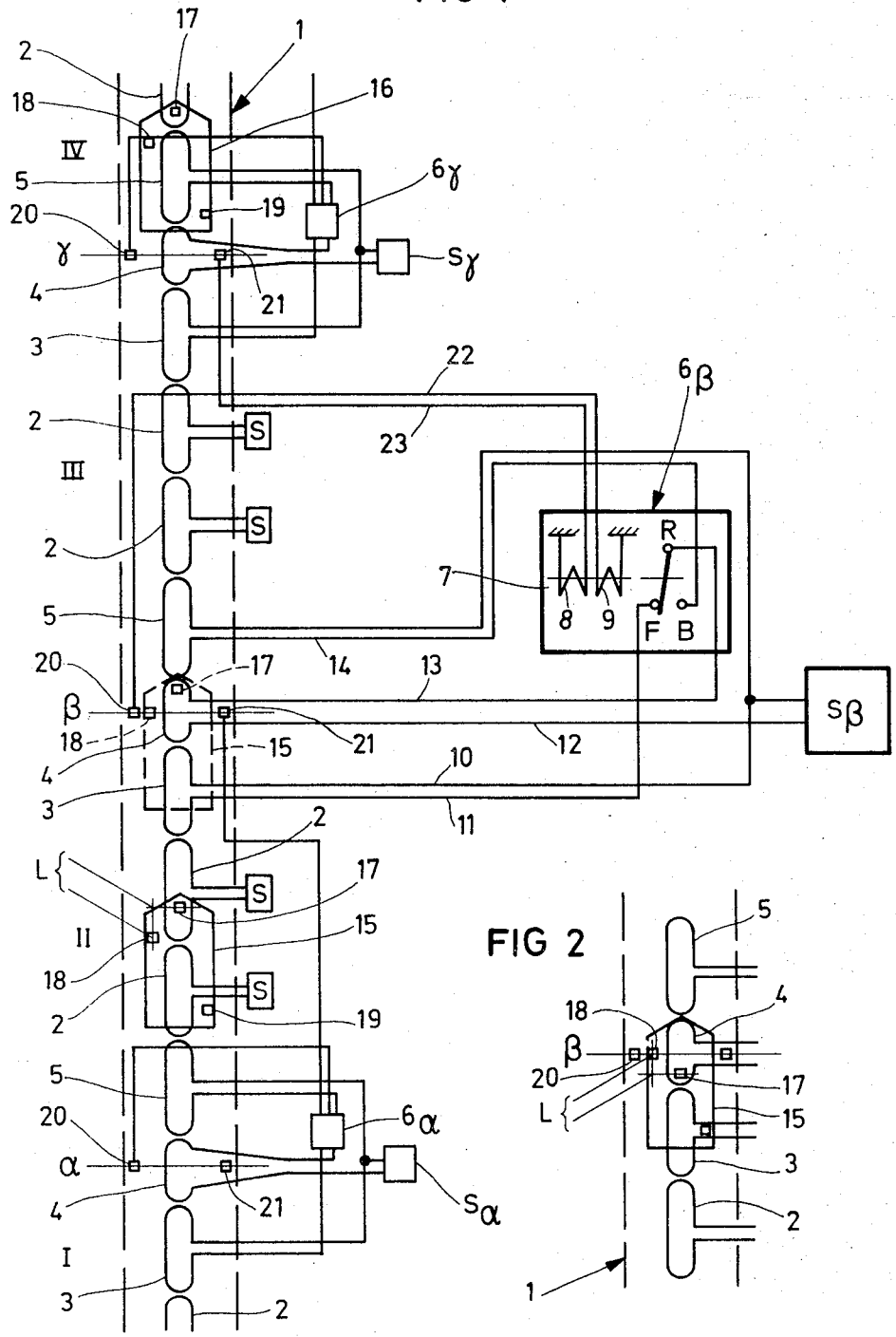
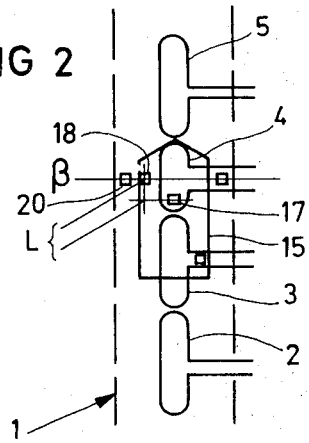
FIG 1
FIG 2

CAR ACTUATED INDUCTIVE BLOCK CONTROL

This invention relates to apparatus for the control of driverless vehicles which travel in one direction along a path that is divided into longitudinally contiguous blocks, and the invention is more particularly concerned with control apparatus by which two such vehicles are prevented from occupying any one block at the same time.

The present invention relates to control systems for driverless vehicles, in which elongated radiating means such as a cable or elongated loop antenna extends along a defined path that the vehicles traverse in one direction. The vehicles may be confined to the path by a rail or rails, or they may steer themselves automatically in response to the detection of signals radiated from the radiating means, as explained in the copending application of J. B. Hoven et al, Ser. No. 296,085, filed Oct. 10, 1972 (which has a common assignee herewith). In either case, encoded command signals are impressed upon the radiating means and are radiated therefrom to be detected and decoded at each vehicle. The several vehicles are thus caused to stop, start, open and close their doors and perform other functions in accordance with the significations of the command signals.

To assure that such a system will fail safe, it is arranged so that a vehicle moves only when it is actually receiving signals from the radiating means. In a sense, therefore, the radiating means can be said to be "energized" when command signals are being impressed upon it. Since the vehicle runs and stops just as if the radiating means supplied power to it, it is immaterial from the standpoint of the present invention whether the radiating means is energized with command signals or with power for driving the vehicle.

Where the system controls the operations of several vehicles simultaneously, the vehicles should be controllable individually, independently of one another. Such individualized control of each of a number of vehicles is provided for by dividing the radiating means into longitudinal segments that comprise individual radiators, and energizing each radiator in a manner appropriate to the control of the particular vehicle that is moving along it. Obviously, assurance must be had that no more than one vehicle will ever be adjacent to any particular radiator. As a practical matter, this means that there should always be at least one unoccupied radiator between each pair of vehicles along the path. The maintenance of such longitudinal separation is of course necessary to prevent the possibility of colliisions between vehicles as well as to insure that every vehicle can be independently controlled.

By analogy to railroad block signal systems, the present invention contemplates maintaining separation between driverless vehicles operating in the same direction by dividing the path along which they move into longitudinally adjacent blocks, with several radiators in each block. The vehicles are so controlled that any particular block can be occupied by only one vehicle at a given time.

The general object of the present invention is to provide extremely reliable control apparatus for a driverless vehicle system of the character described, which apparatus operates automatically to prevent a vehicle from entering a block that is occupied by another vehicle but to permit such entry as soon as the other vehicle passes out of the block.

Another object of the present invention is to provide highly reliable control apparatus for a driverless vehicle system that takes advantage of the above mentioned fail-safe feature by automatically preventing a radiator from being energized when a vehicle should not pass beyond that radiator into a block occupied by another vehicle, and which enables that radiator to be energized as soon as such other vehicle passes out of said block.

The prior apparatus by which a vehicle could normally be prevented from advancing into an occupied block was not absolutely reliable because it did not fail safe. Such apparatus comprised detectors fixed alongside the path traversed by the vehicles, at the boundaries between blocks, and exciters carried by the vehicles for cooperation with the detectors to produce a signal as a vehicle crossed each block boundary. If for any reason no signal was produced as a vehicle moved into a block, the apparatus could not set up the control conditions that prevented a following vehicle from entering the same block while the first vehicle occupied it. Thus the security of the prior block control system depended upon the assured operation of all vehicle carried exciters and of all detectors, and also upon assured cooperation between exciters and detectors.

By contrast, it is another object of the present invention to provide, in a vehicle control system of the character described, automatic block control apparatus that fails safe in the event passage of a block boundary by a vehicle does not produce an appropriate passage signal, and which thus prevents the vehicle from advancing through the block that it is just entering and protects it against the entry of a following vehicle into the block that it is leaving.

It is also a specific object of this invention to provide a control system of the character described wherein two radiators near each block boundary are alternatively energized to assure that a vehicle will not advance any substantial distance into a block unless it can do so safely, but wherein assurance is provided that a vehicle will continue to move past any vehicle passage detector at a block boundary once it has reached the same, so that a signal will be produced by the detector that denotes the location of the vehicle.

In general, the objects of the invention are achieved by means of control apparatus having the features just mentioned and which comprises a bistable switch device for each boundary between blocks and vehicle passage detection means located at each boundary and arranged to actuate the switch devices, the switch device for each boundary being so connected with radiators spaced a short distance to each side of its boundary that said radiators are energized alternatively, so that any failure of the detection means or the switch device will assure stoppage of vehicles. A more particularized understanding of the invention and the manner in which it achieves its purposes will be obtained from the following description and the accompanying drawings, which exemplify the invention, it being understood that changes may be made in the specific apparatus disclosed herein without departing from the essentials of the invention as set forth in the appended claims.

The accompanying drawings illustrate two complete examples of embodiments of the invention constructed according to the best modes so far devised for the practical application of the principles thereof, and in which:

FIG. 1 is a diagrammatic view of a portion of a path along which driverless vehicles are intended to operate and to be controlled by apparatus of the present invention, which is illustrated schematically; and FIG. 2 is a fragmentary view similar to FIG. 1 but illustrating a slightly modified embodiment of the invention wherein the command signal detector on the vehicle is in a different location in relation to the arrival and departure exciters on the vehicle.

Referring now to the accompanying drawings, the numeral 1 designates generally a portion of an elongated path of track along which driverless vehicles are intended to move in one direction. The path may be defined by a rail or rails by which the vehicles are guided, or it may comprise a roadway along which the vehicles are steered automatically. In either case, signal radiating means extend all along the path. As here shown, the signal radiating means comprises a plurality of loops 2, 3, 4, 5, each elongated lengthwise of the path and comprising a radiator which can be energized through a movement command input unit S.

The path or track 1 is divided into blocks I, II, III, IV. The boundary between blocks I and II is denoted by $\alpha$, the boundary between blocks II and III by $\beta$, and that between blocks III and IV by $\gamma$. Note that there are a plurality of the radiators 2 in each block.

The direction of travel of vehicles along the track 1 is assumed to be upwardly on the drawing, so that the lower end of each block constitutes its entry end and its upper end is its departure or exit end.

At this point attention is directed to the group of radiators 3, 4, 5 near each boundary between adjacent blocks, which radiator group is hereinafter designated the "boundary group."

Each boundary group comprises a transition radiator 4 that extends across the boundary and short distances forwardly into the entry end portion of the block directly in front of the boundary and rearwardly into the departure end portion of the block directly behind the boundary. Each boundary group also comprises an exit radiator 3, located rearwardly adjacent to the transition radiator 4, in the exit end portion of the block behind the boundary. Finally each boundary group further comprises an entry radiator 5, forwardly adjacent to the transition radiator 4, in the entry end portion of the block in front of the boundary.

Associated with each boundary group of radiators is a bistable switch device $6\alpha$, $6\beta$, $6\gamma$ and a movement cammand input unit $S\alpha$, $S\beta$, $S\gamma$.

Each of the radiators 2 in the medial portion of a block has its own movement command input unit 2, to impress upon it signals that are appropriate to the control of a vehicle as it moves along that radiator. However, there is only one movement command input unit for the three radiators 3, 4, 5, that comprise each boundary group. The movement command input unit for the boundary group for boundary $\beta$ is designated by $S\beta$.

Only the particular bistable switch device $6\beta$ for the block boundary $\beta$ is shown in detail, the others being identical with it. It will also be understood that each bistable switch device could take any of several known forms. The one here shown for purposes of illustration comprises a double throw relay having two windings 8 and 9 and having an armature or movable element R which is engageable with a fixed contact F in consequence of energization of the winding 8 and which is engageable with another fixed contact B in consequence of energization of the winding 9. It will be understood that a momentary energization of either winding 8 or 9 is sufficient to establish the position of the armature R. Thus the ungrounded terminals of the respective windings comprise a pair of input terminals to which momentary control signals can be alternately applied, and each such control signal changes the condition of the bistable switch device.

The transition radiator 4 for each block boundary is at all times connected with the movement command input unit for its boundary; but its adjacent exit radiator 3 and entry radiator 5 are alternatively connectable with that input unit through the associated bistable switch device. Obviously the transition radiator could be connected with the input unit in parallel with whichever one of its adjacent radiators is being energized, but as here shown the transition radiator is connected in series with the energized entry or exit radiator. The circuit can be traced from the input unit $S\beta$ by way of conductor 10 to the exit radiator 3, thence by way of conductor 11 to thermal F of the bistable switch device. The armature or moveable element R of the bistable switch device has a permanent connection with the transition radiator 4 by way of conductor 13, and conductor 12 provides a return from radiator 4 to input unit $S\beta$. When the bistable switch device is in its condition for energization of entry radiator 5, the circuit can be traced from the input unit $S\beta$ to radiator 5 by way of a branch of conductor 10 thence from radiator 5 to terminal B of the switch device by way of conductor 14, and thence by way of armature R, conductor 13, transition radiator 4 and conductor 12, back to the input unit $S\beta$.

The momentary control signals that establish the condition of the bistable switch device are produced by apparatus described hereinafter and are generated by the passage of a vehicle across a block boundary.

In FIG. 1 a vehicle 15 is shown (in solid lines) occupying the block II at a location intermediate the ends of that block. The same vehicle 15 is shown in broken lines at a later instant when it is crossing the boundary $\beta$ between blocks II and III. Another vehicle that has cleared block III and has moved just a short distance into block IV is designated by 16.

Each of the vehicles has a command signal detector 17 of a known type, for detecting movement command signals impressed upon the radiators and radiated from them. It will be understood that the vehicle also carries suitable apparatus (not shown) for decoding the detected command signals and for causing the vehicle to respond to them. As shown in FIG. 1, the command signal detector 17 may be located at the front of the vehicle.

Each vehicle also carries exciter means 18, 19 cooperable with stationary vehicle passage detection means 20, 21 at each block boundary. As the exciter means is moved past vehicle passage detection means at a block boundary, the detection means is caused to emit a signal that is fed to the bistable switch device associated with that boundary and also to the bistable switch device associated with the rear boundary of the block that the vehicle is departing.

Conceivably each vehicle could carry a single exciter, cooperable with a single vehicle passage detector mounted alongside the path of the vehicle at each block boundary. In that case, however, the vehicle might set up a "cleared" condition for the block it was leaving, even though for some reason it did not fully cross the boundary out of that block.

It is to prevent such a situation that each vehicle is preferably equipped with two exciters, one of them an arrival exciter 18 at one side of the vehicle (the left side, as shown) and near the front of the vehicle, and the other a departure exciter 19, at the other side of the vehicle and near its rear. These two exciters cooperate with a pair of vehicle passage detectors at each block boundary, located at the sides of the path adjacent to the respective exciters 18 and 19 and comprising, respectively, an arrival detector 20 and a departure detector 21. Because of the fore-and-aft location of the exciters 18 and 19 on the vehicle, each arrival detector 20 issues a signal just as a vehicle begins to cross its boundary, and its adjacent departure detector 21 issues a signal a little latter, when the rear end portion of the vehicle is crossing the boundary.

The arrival detector 20 is connected, by means of a conductor 22, with the winding 9 of the bistable switch device for its boundary. The departure detector 21 is connected, by means of a conductor 23, with the bistable switch device for the block boundary next behind it in the direction of vehicle travel.

The operation of the apparatus can now be understood with reference to FIG. 1. It will be assumed that the leading vehicle 16, in leaving block III, has caused departure detector 21 at boundary γ to generate a proper departure signal, which signal is impressed upon winding 8 of bistable switch device 6β by way of conductor 23, so that the switch device is in the position illustrated and the exit radiator 3 adjacent to boundary β is energized. On this assumption, vehicle 15 in block II can move along that exit radiator 3 and also along the relatively short transition radiator 4 which extends across boundary β and to which movement command signals are at all times applied from input unit Sβ. In moving along that transition radiator the vehicle of course crosses boundary β. As its front end portion crosses that boundary, its arrival exciter 18 cooperates with arrival detector 20 to send a momentary control signal (arrival signal) to winding 9 of bistable switch device 6β, reversing the condition of that device so that entry radiator 5 (directly in front of the vehicle) is now connected with input unit Sβ and exit radiator 3 (directly behind the vehicle) is disconnected from that input unit. The vehicle can now continue to advance into block III, along radiator 5, and because the exit radiator 3 directly behind it is de-energized, a following vehicle cannot enter block III while the vehicle 15 occupies it. As the rear end portion of vehicle 15 crosses boundary β, its departure exciter 19 cooperates with departure detector 21 to send a momentary control signal (departure signal) to the bistable switch device 6α for boundary α. The last mentioned departure signal changes the condition of bistable switch device 6α so that the exit radiator 3 just behind boundary α is energized to enable a vehicle in block I to approach boundary α for entry into block II, with concomitant de-energization of the entry radiator 5 just in front of boundary α.

If the vehicle 15 does not give rise to an arrival signal as its front end portion crosses boundary β, then of course bistable switch device 6β will not change condition, and therefore the entry radiator 5 that is directly in front of boundary β will not be energized, so that the vehicle will stop when it reaches that radiator. With the vehicle thus stopped, no departure signal will be generated, either, owing to the fact that the command signal detector 17 and the departure exciter 19 are spaced apart by a distance greater than the length of transition radiator 4 that is in front of the boundary; and, in the absence of a departure signal, the bistable switch device associated with boundary α will remain in the condition to prevent entry of a vehicle into block II.

In like manner, if an arrival signal is generated at boundary β, but no departure signal, the vehicle generating that arrival signal will progress through block III in a normal manner, but the bistable switch device for boundary α will remain in the condition to prevent entry of a following vehicle into block II.

Inasmuch as the vehicle passage detectors can be connected with a central control installation (not shown), in addition to being connected with their respective bistable switch devices, suitable indications can be displayed at that installation to denote signals generated as each vehicle passes detectors at the block boundaries, and the receipt from a particular boundary of an arrival signal not followed promptly by a corresponding departure signal can give rise to a prompt investigation.

FIG. 2 illustrates a vehicle in which the command signal detector 17 is located to the rear of the arrival exciter 18. The location of the command signal detector 17 on the vehicle is dependent upon the availability of space for it on the vehicle, but its distance L from the arrival exciter 18, as measured lengthwise along the vehicle, must be properly related to the longitudinal distance that each transition radiator 4 extends forwardly from its boundary, to insure that a signal will be generated in each arrival detector 20 while the command signal detector is in operative proximity to the transition radiator.

From the foregoing description taken with the accompanying drawings it will be apparent that this invention provides fail-safe block control apparatus for driverless vehicles whereby a vehicle is automatically prevented from entering a block that is occupied by another vehicle.

Those skilled in the art will appreciate that the invention can be embodied in forms other than as herein disclosed for purposes of illustration.

The invention is defined by the following claims:

1. A control system for a plurality of driverless vehicles which are intended to move in one direction along a defined path along which lengthwise elongated radiators are arranged end-to-end, each vehicle being moveable only in response to energization of a radiator to which it is adjacent, said path being divided into longitudinally adjacent blocks, each comprising a plurality of said radiators and each block intended to be occupied by only one vehicle at a time, the front end of one block being defined from the rear end of another longitudinally adjacent block by a boundary which a vehicle crosses is moving from said one block into said other block, said system being characterized by:
   A. there being at each boundary a boundary radiator group comprising
      1. a transition radiator which extends across the boundary and a short distance into each of the blocks adjoining the boundary, 2. an exit radiator longitudinally adjacent to the transition radiator in the front end portion of the block behind the boundary, and
3. an entry radiator longitudinally adjacent to the transition radiator in the rear end portion of the block ahead of the boundary;

B. a plurality of radiator energizing input units, one for each boundary, each connected with the transition radiator for its boundary to energize the same at any time;

C. a plurality of bistable switch devices, one for each boundary, each comprising
1. a pair of input terminals that are adapted to receive control signals alternately,
2. means responsive to a control signal applied to one of said input terminals to effect connection of the entry radiator for its boundary with the input unit for its boundary to the exclusion of the adjacent exit radiator, and
3. means responsive to a control signal applied to the other of said input terminals to effect connection of the exit radiator for its boundary with the input unit for its boundary to the exclusion of the adjacent entry radiator;

D. a plurality of vehicle passage detection means, one at each boundary, each of said detection means being responsive to passage of a vehicle across its boundary to produce a control signal; and E. means connecting the vehicle passage detection means at each boundary
1. with said one input terminal of the bistable switch device for its boundary, so that the entry radiator directly in front of a vehicle at a boundary is energized simultaneously with disconnection of its adjacent exit radiator from the input unit for said boundary, and
2. with the other input terminal of the bistable switch device for the next boundary to the rear, so that an exit radiator can be energized in consequence of a vehicle clearing the block directly in front of that exit radiator.

2. A control system for a plurality of driverless vehicles which are intended to move in one direction along a defined path along which lengthwise elongated radiators are arranged end-to-end each vehicle being movable only in response to energization of a radiator to which it is adjacent, said path being divided into longitudinally adjacent blocks, each comprising a plurality of said radiators and each block intended to be occupied by only one vehicle at a time, the front end of one block being defined from the rear end of another longitudinally adjacent block by a boundary which a vehicle crosses in moving from said one block into said other block, said system being characterized by:

A. there being at each boundary a boundary radiator group comprising
1. an exit radiator in the front portion of the block behind the boundary and which must be energized to enable a vehicle to advance to the boundary, and
2. an entry radiator in the rear portion of the block ahead of the boundary and which must be energized to enable a vehicle which has crossed the boundary to advance through the block that it has entered;

B. a plurality of radiator energizing input units, one for each boundary, for energizing the radiators of the boundary radiator group for said boundary;

C. a plurality of bistable switch devices, one for each boundary and by which the radiators of the group for the boundary are alternatively connectable with the input unit for that boundary, each of said bistable switch devices comprising
1. a pair of input terminals that are adapted to receive control signals alternately,
2. means responsive to a control signal to one of said input terminals to connect the exit radiator with the input unit, and
3. means responsive to a control signal to the other input terminal to connect the entry radiator with the input unit;

D. vehicle detection means at each boundary, responsive to passage of a vehicle across the boundary to produce at least one control signal; and E. means connecting the vehicle detection means at each boundary
1. with said one input terminal of the bistable switch device for that boundary, to enable a vehicle which has crossed the boundary to advance through the block that it has entered, and
2. with said other input terminal of the bistable switch device for the next boundary rearwardly relative to said direction, to enable a following vehicle to approach the rear boundary of a block from which a preceding vehicle has departed.

3. The control system of claim 2 wherein both the entry radiator and the exit radiator of each boundary radiator group are spaced lengthwise a short distance from their adjacent boundary, further characterized by:

F. each boundary radiator group further comprising a transition radiator extending lengthwise between the entry radiator and the exit radiator and across the boundary, said transition radiator being at all times connected with the input unit for the boundary to insure that a vehicle which has traversed the exit radiator adjacent to the boundary will cross the boundary and activate the vehicle detection means thereat.

4. The control system of claim 2, further characterized by:

F. the vehicle detection means at each boundary comprising
1. an arrival detector located at one lateral side of said path and connected with said one input terminal of the bistable switch device for that boundary, and
2. a departure detector located at the other lateral side of said path and connected with said other input terminal of the bistable switch device for said next boundary rearwardly; and G. each vehicle having thereon
1. an arrival exciter near the front of the vehicle and at said one lateral side thereof, for cooperation with the arrival detectors at the several boundaries to cause each to emit a control signal as the vehicle crosses its boundary, and
2. a departure exciter located near the rear of the vehicle and at said other lateral side thereof, for cooperation with the departure detectors at the several boundaries to cause each to emit a control signal that follows by a short time interval the control signal emitted by its adjacent arrival detector.

* * * * *